(12) United States Patent
Durham et al.

(10) Patent No.: US 9,654,498 B2
(45) Date of Patent: May 16, 2017

(54) DETECTING DEVIATION FROM A DATA PACKET SEND-PROTOCOL IN A COMPUTER SYSTEM

(71) Applicant: Assured Information Security, Inc., Rome, NY (US)

(72) Inventors: Robert Durham, Rome, NY (US); Kyle Patton, Indialantic, FL (US); Levi Arthur, Boonville, NY (US)

(73) Assignee: ASSURED INFORMATION SECURITY, INC., Rome, NY (US)

(*) Notice: Subject to any disclaimer, the term of this patent is extended or adjusted under 35 U.S.C. 154(b) by 100 days.

(21) Appl. No.: 14/710,060

(22) Filed: May 12, 2015

(65) Prior Publication Data
US 2016/0337383 A1  Nov. 17, 2016

(51) Int. Cl.
*H04L 29/06* (2006.01)
*H04L 12/26* (2006.01)

(52) U.S. Cl.
CPC ............ *H04L 63/145* (2013.01); *H04L 43/50* (2013.01); *H04L 63/0227* (2013.01); *H04L 63/1408* (2013.01)

(58) Field of Classification Search
CPC .. H04L 63/1441; H04L 63/1446; G06F 21/56
See application file for complete search history.

(56) References Cited

U.S. PATENT DOCUMENTS

2015/0007316 A1\* 1/2015 Ben-Shalom ....... H04L 63/1416
726/23

OTHER PUBLICATIONS

Elasticsearch/Overview (2015) an end-to-end search and analytics platform. indefinately versatile URL: http://www.elasticsearch.org/overview/.
Hogland, Greg; Butler, James (2006). Rootkits: Subverting the Windows Kernel, Chapter 4: The Age-Old Art of Hooking (pp. 71-112).

\* cited by examiner

*Primary Examiner* — Izunna Okeke
(74) *Attorney, Agent, or Firm* — Matthew M. Hulihan; Heslin Rothenberg Farley & Mesiti PC

(57) ABSTRACT

A determination is made as to whether an attempt to send a data packet from a computer system has deviated from an established protocol for sending data packets from the computer system is made. The determination includes obtaining a data structure describing the data packet, and, based on invocation of a function to deliver the data packet to a module of a stack of the computer system, the module interfacing network hardware for sending the data packet, checking for presence of a tag placed in the data structure by a component of the stack and indicative of whether the attempt to send the data packet has deviated from the established protocol. Processing is then performed based on the determination of whether the attempt has deviated from the established protocol.

19 Claims, 11 Drawing Sheets

DETECTING DEVIATION FROM A DATA PACKET SEND-PROTOCOL IN A COMPUTER SYSTEM

BACKGROUND

Modern malicious software ("malware") and rootkits pose a serious threat to information assurance ("IA"). This class of software attempts to exfiltrate sensitive data by sending it from a computer system across a network to unauthorized systems. Because of firewalls or other security facilitates in place on the computer system to prevent such exfiltration, malicious software often must perform the sending in a stealth manner. As an example, the malicious software may employ kernel code (that is, code executing on a processor operating in a privileged mode, such as kernel mode) that bypasses portions of the driver stack in place on the computer system for sending data, in order to avoid detection from modern host-based intrusion detection systems (HIDS), firewalls, rootkit detectors, or other types of security facilities.

BRIEF DESCRIPTION OF THE DRAWINGS

Aspects of the present invention are particularly pointed out and distinctly claimed as examples in the claims at the conclusion of the specification. The foregoing and other objects, features, and advantages of aspects of the invention are apparent from the following detailed description taken in conjunction with the accompanying drawings in which:

DETAILED DESCRIPTION

Modern operating systems rely on a system call interface specification to handle sending of data from a computer system. The system call interface specification serves as an application programming interface (API) for the physical hardware (e.g. network interface cards (NICs)). It forms a layer of abstraction from the underlying complexity of the NIC in such a way that NICs, for a given media (e.g. Ethernet), can be accessed using the common programming interface.

Examples are described herein with reference to the Network Driver Interface Specification (NDIS), which is the system call interface specification used in the Windows® line of operating systems offered by Microsoft Corporation (Windows is a registered trademark of Microsoft Corporation, Redmond, Wash., USA). The NDIS is implemented as a library of wrappers that create a standard interface between hardware level NIC drivers and network protocol drivers. Although examples are described herein with reference to NDIS, these are only for purposes of example and illustration; aspects described herein may be readily applied to other system call interface specifications, such as those used in operating systems other than the Windows® line of operating systems.

The NDIS is built using drivers that sit in logical layers to form a driver stack. The NDIS version 6.x architecture supports four primary types of network drivers: the NDIS protocol driver, NDIS lightweight filter (LWF) driver, NDIS miniport driver, and NDIS intermediate driver. The NDIS LWF driver is a relatively new driver type added in NDIS v6.0 to replace the NDIS intermediate driver type.

Figure 1:
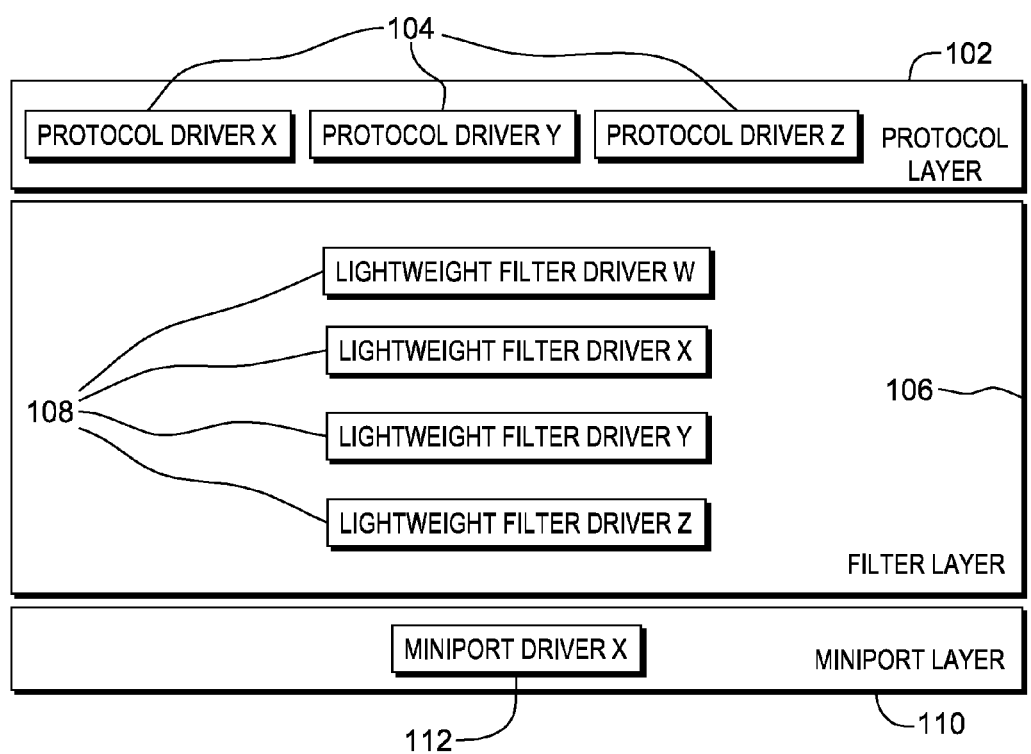
FIG. 1 depicts an example driver stack with three logical layers for use in sending a data packet from a computer system.

FIG. 1 depicts an example driver stack with three logical layers for use in sending a data packet (also referred to herein as a network packet) from a computer system. An NDIS driver is implemented in one of the three logical layers of the NDIS hierarchy of drivers (also known as the NDIS driver stack). The three logical layers in FIG. 1 are the protocol layer 102, having protocol drivers 104, the filter layer 106, having lightweight filter drivers 108, and a device-agnostic interface layer, called a miniport layer 110, having miniport driver 112. Each layer includes one or more drivers. Typically, a miniport driver instance will exist for each different NIC in the computer system.

The NDIS is responsible for managing the relationship between each driver layer and maintaining critical information for each driver, such as state information, characteristics, pointers to driver dispatch functions, handles, and parameter blocks for linkage, as examples.

Figure 2:
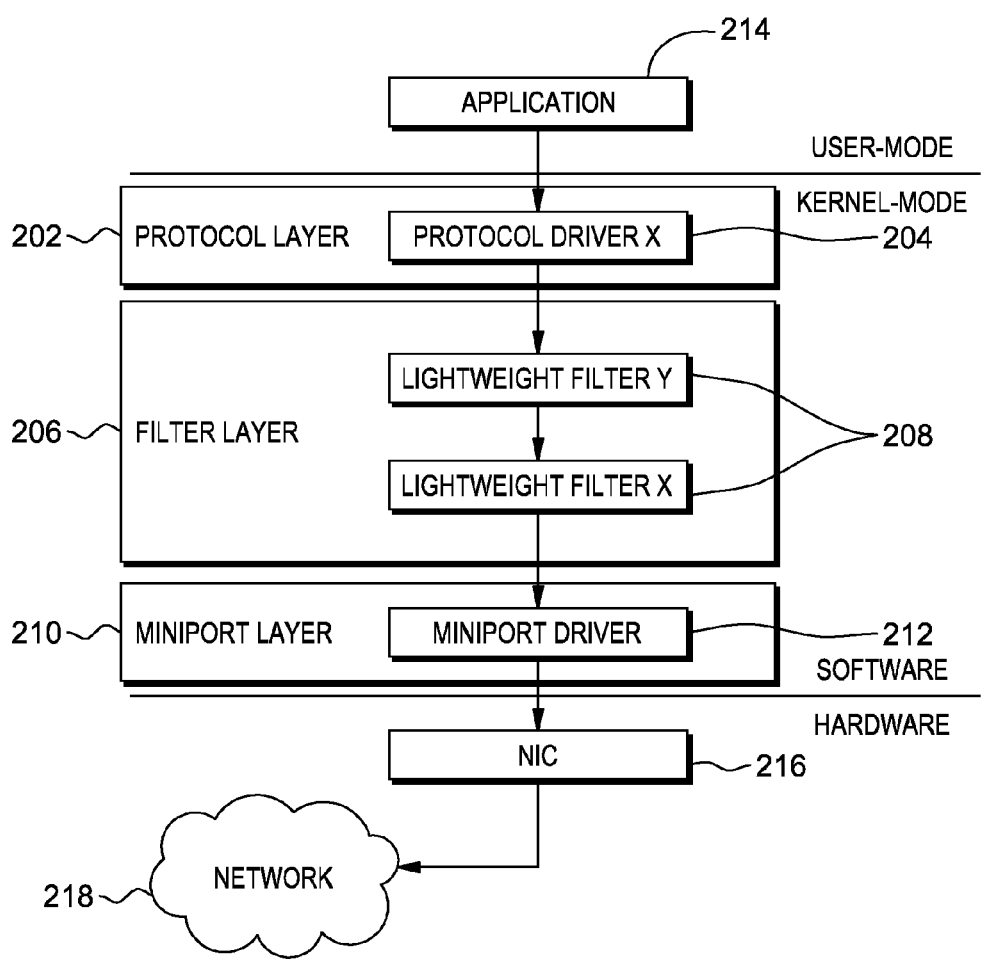
FIG. 2 illustrates a send path of a driver stack through which data originating from an application is sent from the computer system to a network.

When data is to be sent from the computer system, the data traverses a send path through the driver stack. This is described and depicted with reference to FIG. 2, which illustrates a send path of a driver stack through which data originating from an application executing in user-mode is sent from the computer system to a network using the network protocol provided by NDIS executing in kernel-mode.

Application 214 opens a channel (socket) between itself and a specific NDIS protocol driver 204 (for instance TCPIP.sys) in protocol layer 202. Data is sent from the application to the protocol driver 204, which will process the data sent from the application and generate a network packet. Once the network packet has been generated by NDIS protocol driver 204, the packet is then provided through the filter layer stack of registered NDIS filter drivers, called lightweight filters 208 (LWFs) in filter layer 206. There are two LWFs 208 in this example, though there may be zero or more LWFs in other examples. Each NDIS LWF has the opportunity to perform processing on the network packet before the packet is provided for handling by the miniport driver 212 in miniport layer 210. Miniport layer 210 is a layer for abstracting device-specific drivers, e.g.

network hardware (NIC) device-specific drivers. The NIC is the hardware that sends the packet onto the network 218. A miniport driver communicates with a specific NIC driver in the system, thereby interfacing the software with the NIC.

Miniport driver 212 will communicate with the NIC 216 (i.e. through a NIC hardware specific driver, not pictured, in between the miniport and actual hardware) and send the network packet out onto the network 218, completing the process. Behavioral analysis of the example operating system has yielded that this is the appropriate method for sending a network packet to a remote host. Deviations from this path may be considered to be suspicious (though some may purposefully be whitelisted, as described in further detail below, such as when a HID system legitimately originates a packet that does not follow the above-described path).

The established protocol of the computer system for sending a data packet onto a network might include security features such as HIDS, firewalls, or rootkit detectors, as examples, to prevent malicious data exfiltration. Many times low-level firewalls and HIDS are implemented within user mode or in kernel-mode near the top of the filter layer of the NDIS kernel network stack, i.e. as a NDIS LWF driver. As described above, NDIS LWF drivers can monitor and filter the network traffic that passes between the protocol layer, which generates the packet, and the miniport layer, which communicates the network packet to the NIC. Consequently, in order for malware to bypass these security features they will attempt to circumvent the filter drivers present in the filter layer of the NDIS driver stack. One possibility is for the malicious software to execute code directly within the kernel (e.g. as a kernel driver) to send packets, potentially containing sensitive data, to bypass this normal protocol. Bypassing low-level firewalls and HIDS tends to be the main motivating factor for developing a kernel driver that circumvents the normal send path.

Figure 3A:
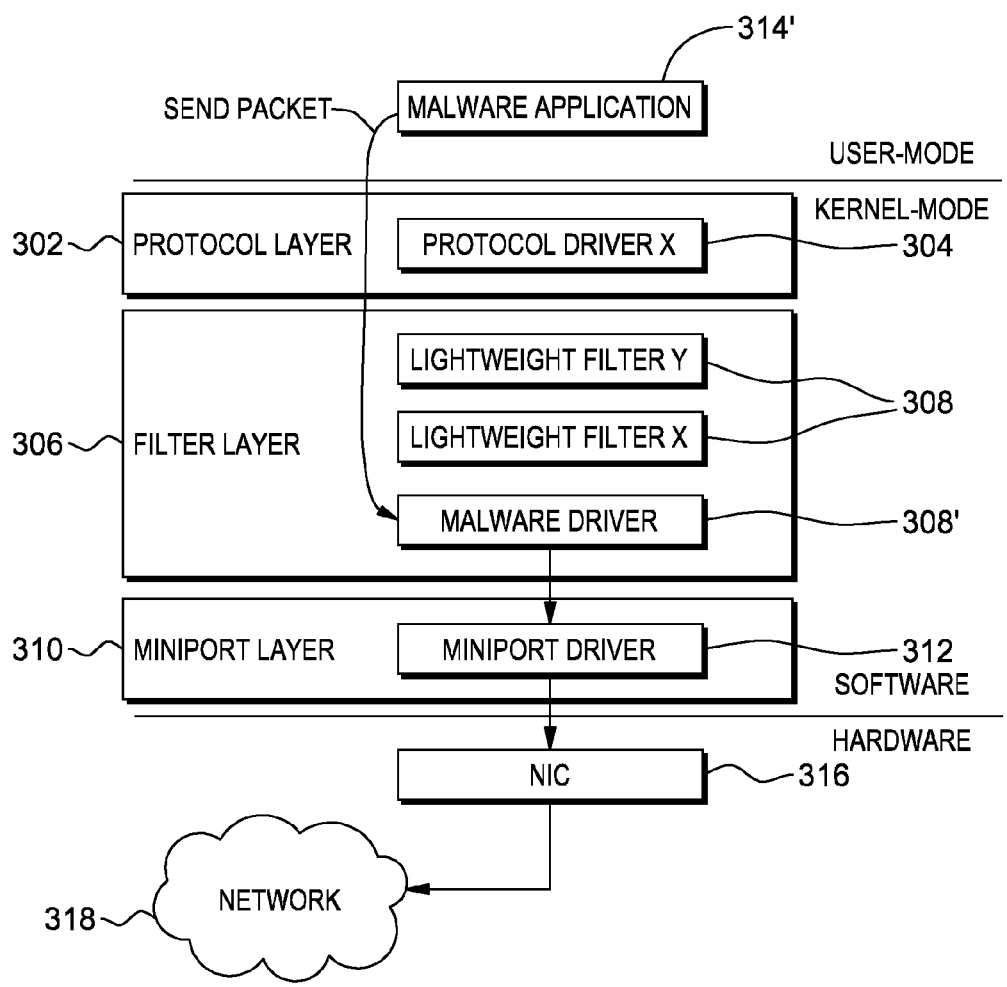
FIGS. 3A and 3B depict examples in which malicious software deviates from an established protocol in sending a data packet from a computer system.
Figure 3B:
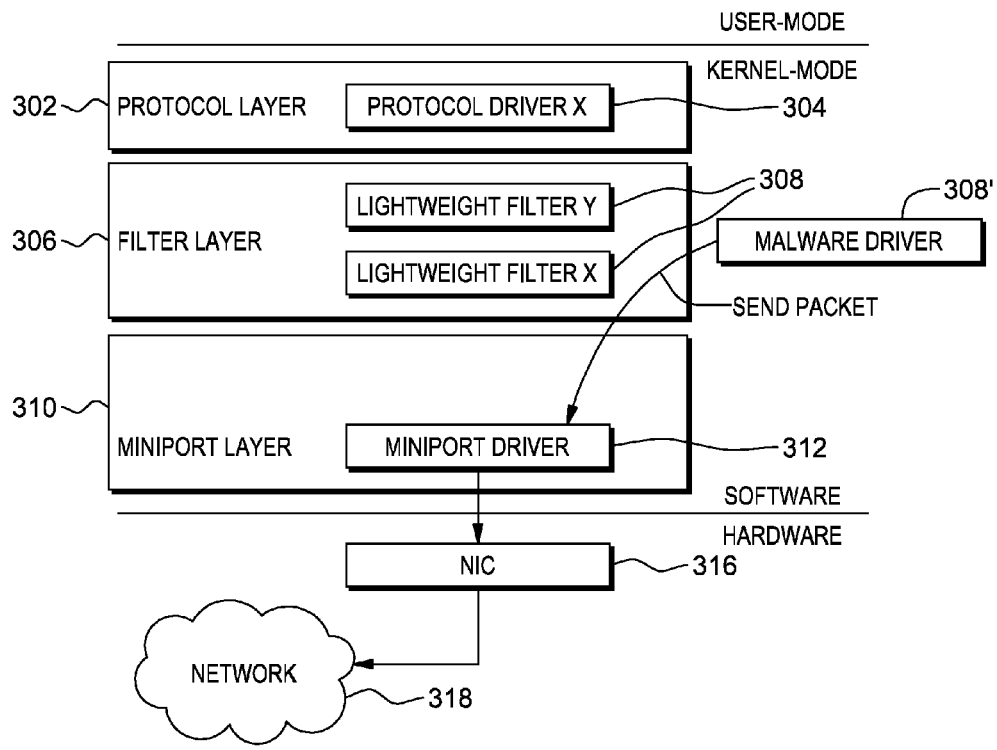

FIGS. 3A and 3B depict examples in which malicious software deviates from an established protocol in sending a data packet from a computer system. In the example of FIG. 3A, a malware application 314' executing in user-mode interfaces with a kernel-mode malware driver 308'. Malware application 314' sends the packet to malware driver 308', bypassing elements of the NDIS network driver stack in the normal send path, i.e. protocol driver 304 in protocol layer 302, and filter layer elements 308 in filter layer 306. Malware driver 308' has inserted itself as the lowest entity in filter layer 306 of the driver stack so that the malicious data packet bypasses security features installed in filter layer 306. From the malware driver 308', the network packet follows the rest of the established send path, i.e. through miniport driver 312 in miniport layer 310 to the NIC 316 and finally to network 318.

Another example, depicted in FIG. 3B, shows a malware driver executing in kernel-mode directly invoking a miniport driver's send function. Here, malware driver 308' executes in kernel-mode but outside of (i.e. not as part of) the driver stack. Here, as in FIG. 3A, components of the protocol layer 302 and filter layer 306 are avoided because the packet is sent directly from malware driver 308', which invokes directly the send function of the miniport driver 312. The packet then travels through the balance of the send path, e.g. though miniport driver 312 and to NIC 316 onto network 318.

Aspects described herein provide for detection of network packets for which the sending has deviated from the established protocol for sending data packets, such as those sent by malware as described and depicted with reference to FIGS. 3A and 3B. Components and related processing to facilitate this detection are collectively referred to herein as "LastDefense". LastDefense is able to detect when sending packets does not follow the normal operating-system-provided paradigm for sending of packets, and can perform processing based on the detection, such as flagging the packets as potentially originating from malware within the kernel.

Detection is provided, in part, by LastDefense using packet tagging/marking to identify packets arriving at protocol drivers from user-mode applications. LastDefense also monitors a packet arriving at a miniport driver for sending to a NIC, in order to verify that the packet has been so tagged. If a packet arriving at the miniport driver does not contain the proper tag, then it may be flagged as potentially malicious (because it originated from somewhere else in the kernel for instance). Logging of at least some of the contents or other data associated with the packet may be performed to enable subsequent review by a system administrator, as an example.

Since LastDefense compares the network traffic generated in the protocol layer of the NDIS stack to the traffic that is sent to the NIC, it will detect attempts to deviate from the established protocol for sending data packets, for instance when malware attempts to hide network traffic or bypass HIDS by injecting packets into the system's network stack. Packets sent by malware in FIGS. 3A and 3B may be detected as deviating from the established protocol and logged as malicious because their sending has bypassed the protocol layer and therefore the packet was not tagged by a LastDefense component configured to perform that tagging.

Accordingly, LastDefense identifies network traffic that does not take the defined path through the network driver stack. According to embodiments described herein, hooks are placed in strategic locations of the NDIS driver stack in order to verify that network packets being sent out on the network have taken the defined path. These may be placed when the computer system is started, such as during boot of the operating system, as an example.

More specifically, LastDefense can utilize multiple hooks on a Windows® operating system based computer to accomplish this goal. They are described below with reference to the NDIS, though the principles are more generally applicable to other system call interface specifications. The two hooks in this example are a Direct Kernel Object Manipulation (DKOM) hook and a function hook.

In order to place these hooks, LastDefense first locates the address of the NDIS_M_DRIVER_BLOCK data structure that corresponds to the NIC device it is monitoring. In this regard, there is generally a linked list of NDIS_M_DRIVER_BLOCK data structures, each such structure corresponding to a NIC in the computer system. A NDIS_M_DRIVER_BLOCK data structure is the root structure to the information held by NDIS. Since the NDIS_M_DRIVER_BLOCK data structure is unexported, it is referenced by first locating it in memory. In order to locate this data structure in memory, a temporary function hook may be placed on the Windows® function IoAllocateDriverObjectExtension, which will return a reference to the first structure in the linked-list of NDIS_M_DRIVER_BLOCK structures when invoked by the exported Windows® function, NdisMRegisterMiniportDriver. Based on obtaining the reference to the first NDIS_M_DRIVER_BLOCK, the hook on IoAllocateDriverObjectExtension may be removed. The linked list may be traversed until the correct NDIS_M_DRIVER_BLOCK (i.e. the one corresponding to the NIC device for monitoring) is located. As an example, each NDIS_M_

DRIVER_BLOCK may include an AssociatedProtocol pointer to an associated NDIS_PROTOCOL_BLOCK structure. Within this structure may be field(s) (i.e. BindDeviceName and RootDeviceName) that identify the NIC associated with that NDIS_M_DRIVER_BLOCK. The linked-list of NDIS_M_DRIVER_BLOCKS can be traversed until the NDIS_M_DRIVER_BLOCK associated with the desired NIC is located. When the correct NDIS_M_DRIVER_BLOCK is located, the address of the data structure has been determined and the process can proceed to place the two hooks that facilitate operation of aspects described herein.

Figure 4:
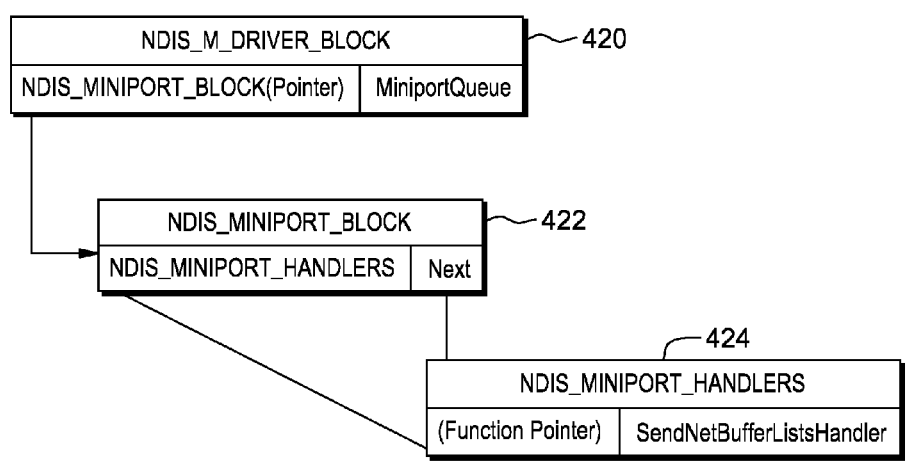
FIG. 4 depicts traversal of data structures defined by a system call interface specification to access pointers to functions for delivering a data packet to drivers of a driver stack of the computer system, in accordance with aspects described herein.

The first hook may be a DKOM hook on a function for delivering a data packet to a driver of a driver stack of the computer system. The DKOM hook may be placed by traversing standard data structures of the interface specification. This is described with reference to FIG. 4, which depicts traversal of data structures defined by a system call interface specification to access pointers to functions for delivering a data packet to drivers of a driver stack of the computer system, in accordance with aspects described herein. In this example, which is based on NDIS, the NDIS_M_DRIVER_BLOCK data structure 420 includes a pointer to a first NDIS_MINIPORT_BLOCK data structure 422 in a linked list of NDIS_MINIPORT_BLOCK data structures. Each LWF and miniport driver in the stack may be associated with a corresponding NDIS_MINIPORT_BLOCK. To invoke handling of a data packet by a given driver in the stack, a SendNetBufferListsHandler function associated with the driver is invoked. Thus, the NDIS_MINIPORT_BLOCK associated with the first LWF (e.g. LWF Y 308 in FIG. 3B) in the filter layer, for instance the first NDIS_MINIPORT_BLOCK 422 in the linked list, is located, and the DKOM hook placed in accordance with aspects described herein is placed by replacing the function pointer for the SendNetBufferListsHandler function of an NDIS_MINIPORT_HANDLERS data structure 424 associated with the NDIS_MINIPORT_BLOCK structure 422. More specifically, the function pointer is overwritten with the address of a separate handler (tagging component of LastDefense) described in further detail below to perform placing a tag in data structures describing data packets generated by a protocol driver. By overwriting that function pointer, a call to the function, by a protocol driver for instance, invokes the separate handler, which places the tag. Then the separate handler can direct execution to the original pointer for SendNetBufferListsHandler that was previously overwritten. Adding the DKOM hook positions the tagging component to be the first entity to receive network packets on the send path after they have been generated by a protocol driver in the protocol layer of the NDIS driver stack. It sits conceptually between the protocol driver and the first LWF driver, therefore at the bottom of the protocol layer or top of lightweight filter layer.

The purpose of the second hook is to position another handler (a checking component of LastDefense, described further below) to check that data packets being invoked for sending by a miniport driver have been tagged by the tagging component. This evidences that the data packet traveled through the normal send path, i.e. through the LWF drivers. The second hook placed is a direct function hook on the SendNetBufferListsHandler function that is exported to NDIS by the miniport driver (e.g. 312 of FIG. 3B) for the subject NIC. When the miniport driver loads, it exports the address of the SendNetBufferListsHandler function for NDIS to invoke when it needs to deliver a network packet to the miniport driver. The address of this function is determined by, for instance, traversing the appropriate NDIS data structures, for instance the NDIS_MINIPORT_BLOCKs. The function is hooked directly by, for instance, code-patching the prologue of the function. This creates a deep hook that would prevent malware from circumventing the checking component of LastDefense by looking up the function address, as LastDefense does, and invoking it directly, as opposed to going through the legitimate NDIS send path. In other words, even an attempt by malware to deliver a packet directly to a miniport driver (as shown in FIG. 3B) will be intercepted and identified as having deviated from the establish send protocol.

Techniques for Windows® function lookup and kernel hooking are described in the prior art, for instance in Hoglund, Greg et al., *Rootkits: Subverting the Windows Kernel*, Ch. 4: The Age-Old Art of Hooking, p. 71-112 (2006), which is hereby incorporated herein by reference in its entirety.

Figures 5, 6:
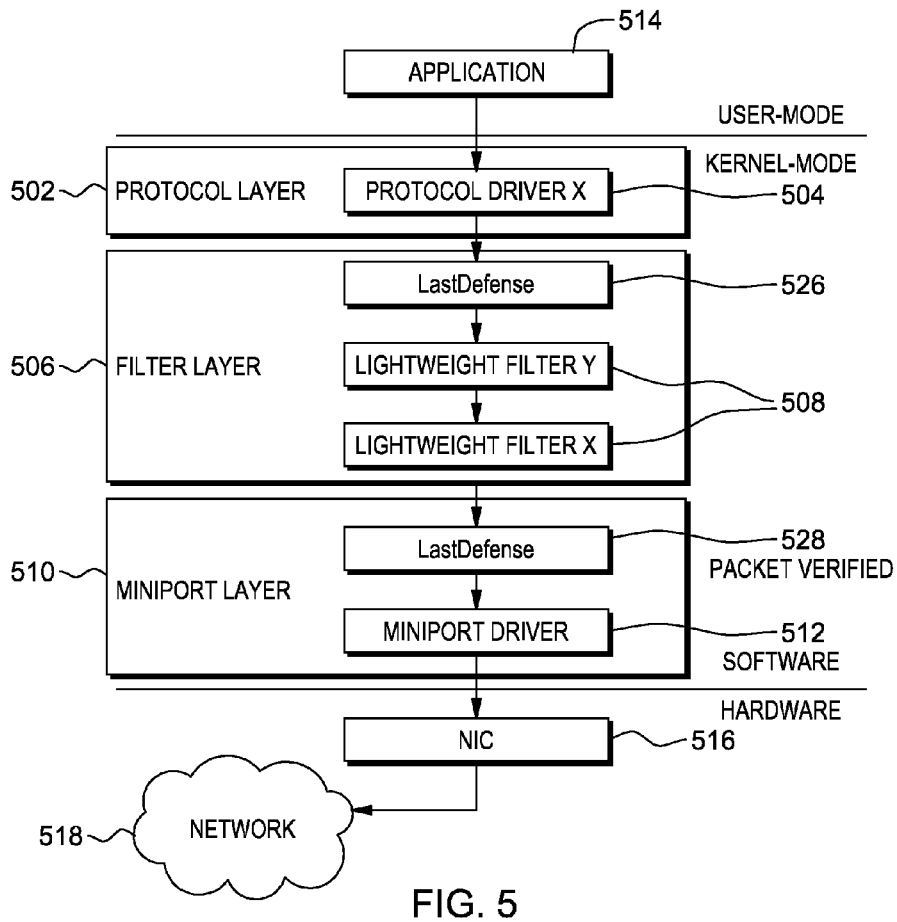
FIG. 5 depicts an example driver stack in which handlers have been installed in accordance with aspects described herein to facilitate identification of attempts to deviate from an established protocol for sending a data packet.
FIG. 6 depicts an example definition of a data structure for describing a data packet and in which a tag may be placed in accordance with aspects described herein.

FIG. 5 depicts an example driver stack in which handlers have been installed in accordance with aspects described herein to facilitate identification of attempts to deviate from an established protocol for sending a data packet. As before, the normal send path involves an application 514 from which data is being sent, protocol layer 502 with a protocol driver 504, filter layer 506 with multiple lightweight filter drivers 508, miniport layer 510 with miniport driver 512, NIC 516 and network 518.

As shown in FIG. 5, LastDefense component 526 is positioned by way of the DKOM hooking described above as the first entity in filter layer 506 to handle a data packet generated by protocol driver 504 in protocol layer 502. Alternatively, component 526 could be represented as being the last component in the protocol layer 502 (see FIG. 7A, for example). Given the parallel nature of protocol drivers in the NDIS protocol layer, positioning of tagging component 526 as being the target of protocol driver calls to invoke LWF driver Y (508) allows it to intercept/tag traffic that is generated by any of the protocol drivers destined for the NIC for which that component 526 is monitoring the sending of data packets. In some examples, a separate component 526 is provided for each respective send path for the NICs in the system for which monitoring is performed, though in other examples a component 526 is responsible for tagging data packets being sent through any of several different NICs.

In this position, component 526 places a tag in a field of a data structure describing the data packets generated by protocol driver 504. An example such data structure in NDIS is the NET_BUFFER_LIST data structure, an example definition of which is shown in FIG. 6. Each network packet sent according to NDIS is indirectly encapsulated and described by a NET_BUFFER_LIST data structure. The tag placed in the data structure field serves as a signature that can be identified later (i.e. farther along in the send path) by the checking component. Advantageously, LastDefense component 526 can avoid modifying the network packet itself; rather, it may place the tag in a field that is observed to be an unused field of the NET_BUFFER_LIST data structure as the packet traverses the network stack. Referring to FIG. 6, a NET_BUFFER_LIST data structure 600 is shown having an unused field 630, which in this example is a "Status" field of type NDIS_STATUS. The Status field may otherwise be unmodified throughout the lifetime of a send packet, as documented by the operating system provider.

In other examples, one or more tags may be placed in one or more other fields and/or data structures describing the data packet, if desired. In this manner, the detection described herein may be performed absent modification to the data packet itself.

With the second hook in place, upon invoking the SendNetBufferListsHandler function associated with miniport driver 512 after the data packet is handled by LWF X, the function hooking directs execution to the LastDefense checking component 528, conceptually provided between the last lightweight filter 508 in the lightweight filter layer 506 and the miniport driver 512 in the miniport layer 510. LastDefense component 528 checks a received NET_BUFFER_LIST structure (i.e. a field thereof, such as the Status field) for a tag placed by component 526. Presence of the tag is evidence that the data packet properly traveled through the send path and therefore was subject to the appropriate filtering and/or other security measures in place for outgoing traffic. In this case, the tag may optionally be removed from the data structure and/or the original value of the field in the data structure may be restored, and the data packet continues through the send path onto the network.

If no tag is present, the tagging component 526 was bypassed and the attempt to send the data packet has deviated from the established protocol/send path. It may therefore be assumed that the data packet is the product of a malicious attempt to exfiltrate data. Any desired processing of the data packet may then be performed since execution at that point resides with the separate handler. In some examples, the contents of the packet are logged to a local or remote file. By way of specific example, some or all of the packet contents are logged in a packet capture file-format, such as '.pcap', to allow for easy viewing via any of a variety of packet analysis applications, like Wireshark (offered by the Wireshark project, available at www.wireshark.org; WIRE SHARK is a trademark of WIRESHARK FOUNDATION INC., California, U.S.A.). A centralized logging infrastructure may be used, for instance one built using tools such as Elasticsearch, Logstash, Logstash-forwarder, and Kibana (offered by ElasticSearch BV, Netherlands) (referred to as the Logstash Suite).

Log generation may be handled asynchronously by kernel worker threads, minimizing or eliminating the effect that LastDefense has on network overhead. The logs may be stored on the hard disk of the local machine running LastDefense and/or stored remotely, for instance to be analyzed by remote analysis.

Figure 7A:
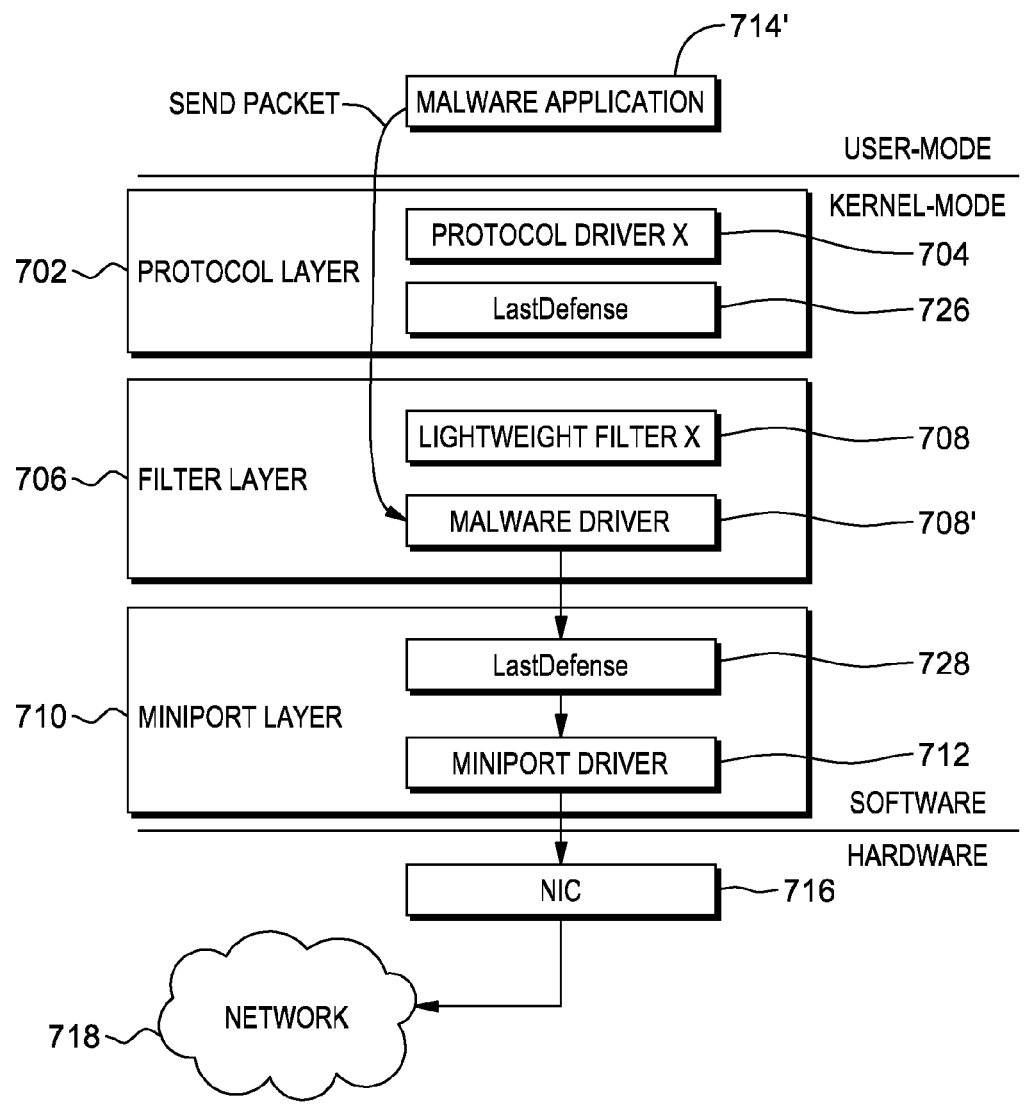
FIGS. 7A and 7B illustrate attempts by malicious software to deviate from an established protocol for sending data packets through the example driver stack of FIG. 5.
Figure 7B:
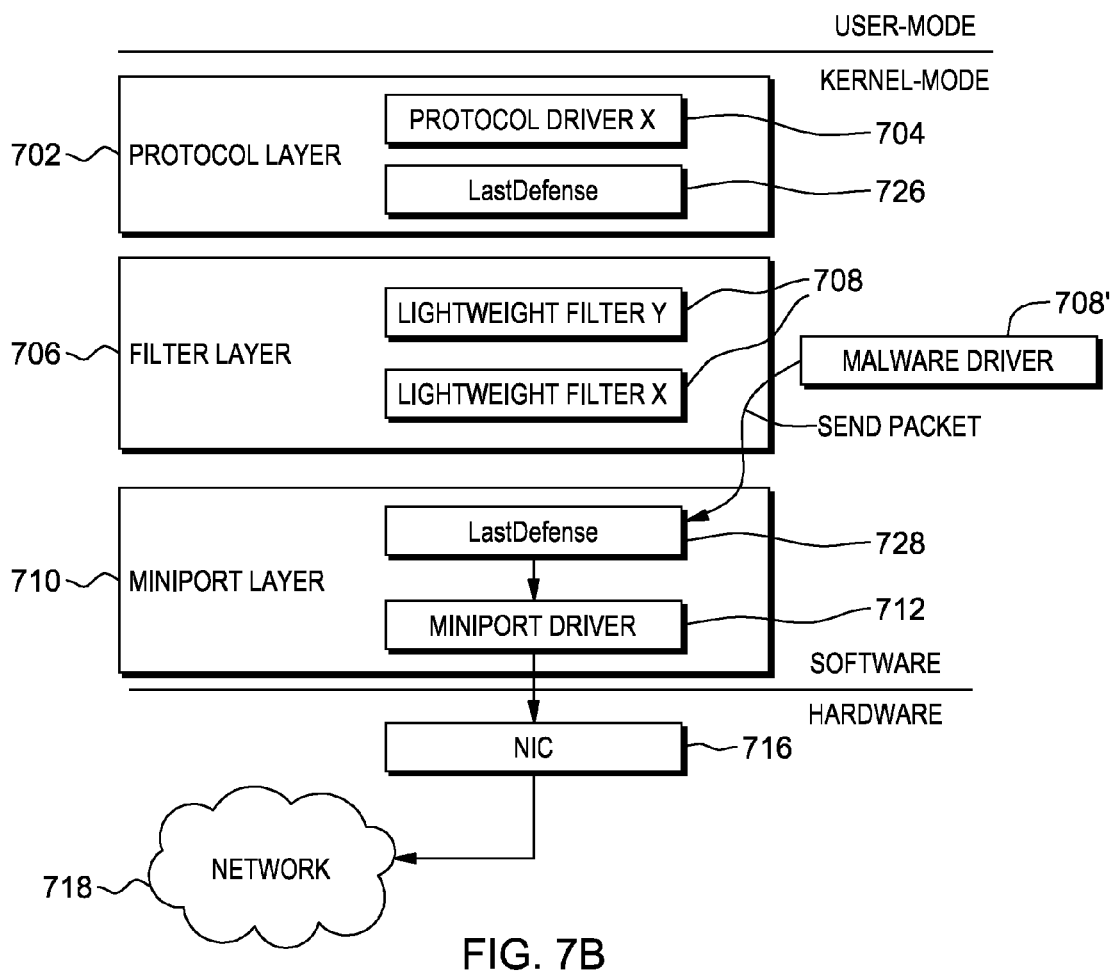

FIGS. 7A and 7B illustrate attempts by malicious software to deviate from an established protocol for sending data packets through the example driver stack of FIG. 5, which incorporates aspects of LastDefense as described herein. The attempts in FIGS. 7A and 7B mirror those shown in FIGS. 3A and 3B.

In FIG. 7A, malware application 714' injects a data packet into the driver stack by sending the packet to malware driver 708' in filter layer 706. Protocol driver 704 in protocol layer 702 and lightweight filter driver 708 in filter layer 706 are bypassed in this attempt to send data. Because the data packet was not properly constructed by protocol driver 704 and, consequently, was not handled by LastDefense tagging component 726, the data structure describing the data packet will not have a tag placed by LastDefense component 726. The malware driver will pass handling of the data packet to a next entity in the stack—either an underlying filter layer driver, or a miniport driver if the malware driver is the last entity in the filter layer, as is the case in FIG. 7A. Malware driver 708' therefore invokes the send function of miniport driver 712 in miniport layer 710. LastDefense component 728 will hook into that function to perform a check for the tag paced into the data structure. This check will reveal that no such tag exists. Any appropriate action may be taken by component 728 or another component, such as logging packet contents and/or blocking the data packet from being sent through miniport driver 712 to NIC 716 and network 718.

In FIG. 7B, a malware driver 708' attempts to invoke miniport driver 712 directly to send a data packet. However, based on the hooking described above, LastDefense component 728 will obtain the data structure describing the packet and recognize that no tag from LastDefense component 726 is present. As before, any appropriate action may be taken, such as logging packet contents and/or blocking the data packet from being sent through miniport driver 712 to NIC 716 and network 718.

The tag placed into the data structure may be any appropriate tag, such as a static value other than the default value for the field being used to hold the tag. In some examples, the tag is a value defined at boot-time and/or random. Such a dynamic value can provide an added layer of security in case the static marker is reversed or compromised.

A 'false positive' identified by the checking component (e.g. 728 of FIG. 7A and 7B) is a packet flagged as suspicious by LastDefense that originated from a legitimate source. A data packet generated by a legitimate, uncompromised LWF in the network stack is one example. In such cases, if present, then a white list feature could be implemented to allow packets from a given source (such as a particular trusted LWF) to be trusted by the LastDefense checking component. An example implementation of this white list feature would see additional hook(s) included at one or more nodes of the NDIS_MINIPORT_BLOCK linked-list, which hook(s) would perform an inspection/marking of the packet in between handling by the filter driver(s) in the stack.

Figure 8A:
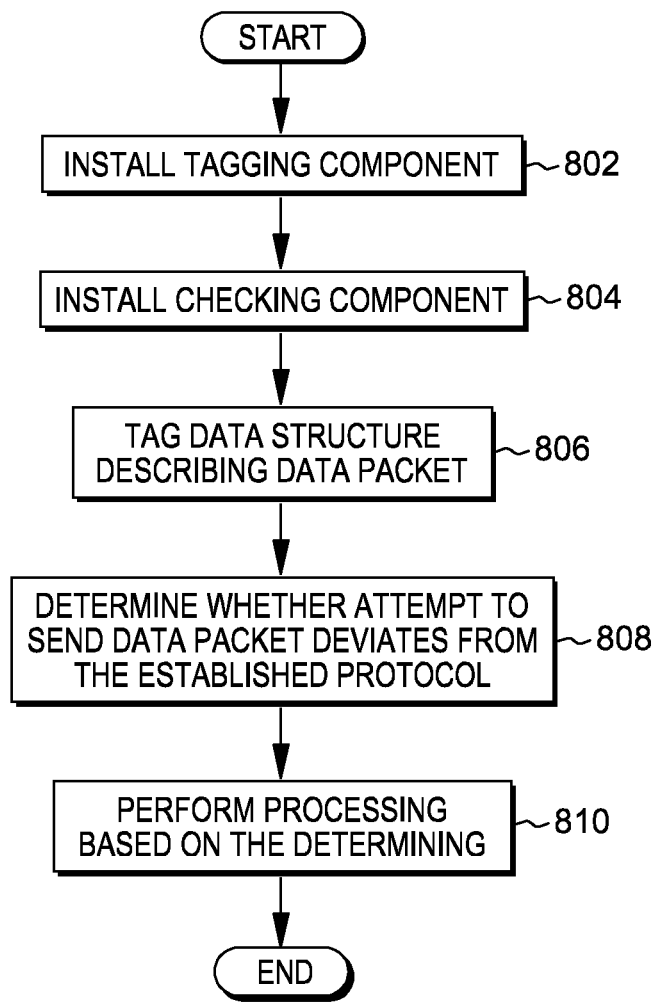
FIGS. 8A-8C depict example processes for detecting deviation from a data packet send-protocol in a computer system, in accordance with aspects described herein.
Figure 8B:
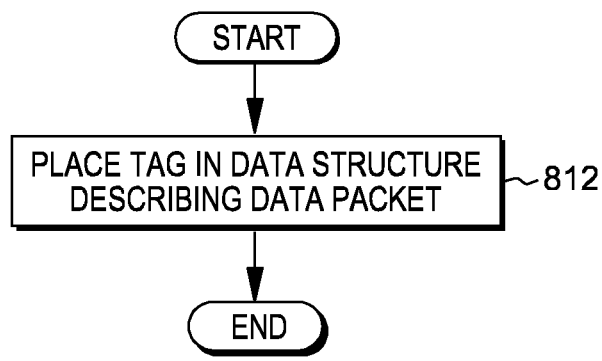
Figure 8C:
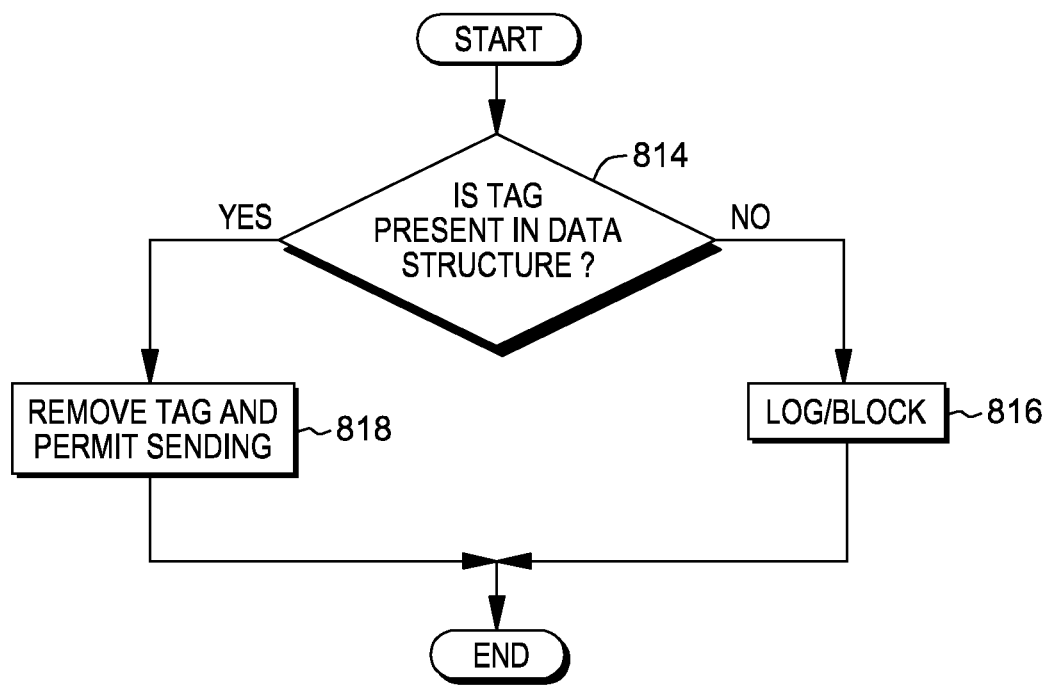

FIGS. 8A-8C depict example processes performed by one or more computer systems for detecting deviation from a data packet send-protocol in a computer system, in accordance with aspects described herein. Such processes can be used to detect and prevent malicious data exfiltration, as an example. Referring to FIG. 8A, the process begins by installing on a computer system a tagging component (802) and a checking component (804) into a driver stack of the computer system. An example tagging component is 526 of FIG. 5 and an example checking component is 528 of FIG. 5. As a data packet is generated, a data structure describing the data packet is tagged (806) by the tagging component, further details of which are provided with reference to FIG. 8B. Continuing with FIG. 8A, the process determines whether an attempt to send the data packet from the computer system deviates from an established protocol (808). For a given packet, the data structure describing the data packet is obtained and it is determined whether the attempt to send the data packet from the computer system has deviated from the established protocol for sending data packets from the computer system. Finally, processing is performed based on the determining whether the attempt deviates from the established protocol (810). This determining and subsequent processing based thereon is described in further detail below with reference to FIG. 8C.

FIG. 8B depicts an example process performed by the tagging component. The process includes placing a tag in the data structure describing the data packet (812). This placement of the tag may be based on the data packet being generated by a protocol driver of the stack.

FIG. 8C depicts an example process performed by the checking component for determining whether an attempt to send the data packet from the computer system has deviated from the established protocol for sending data packets from the computer system, and performing processing based thereon. It involves checking for presence of the tag placed in the data structure by a tagging component of the stack. The stack may be a driver stack and the module may be a driver of the driver stack. The tag is indicative of whether the attempt to send the data packet has deviated from the established protocol. In one example, the process is invoked based on invocation of a function to deliver the data packet to a module of a stack of the computer system, the module interfacing network hardware for sending the data packet. The process begins by determining whether the tag is present in the data structure (814). Based on that determining, processing is performed. For example, if the tag is present, then the tag is removed and sending of the data packet is permitted (818). Permitting sending may involve the checking component passing handling of the data packet to a next component in the driver stack, for instance directing execution back to the function to deliver the data packet to the miniport driver for handling.

If instead at 814 it is determined that the tag is not present, then the process may log contents of the data packet for analysis and/or block the data packet from being sent from the computer system (816).

In some examples, the tagging component installed into the stack is a handler that is configured to perform, based on the data packet being generated by a protocol driver of the stack, the placing of the tag in the data structure describing the data packet. Installing the tagging component into the stack may include replacing a function pointer of a send handler defined by a system call interface specification for the stack with a pointer to the handler to place the tag, where the replacing positions the handler to place the tag as a first entity of the stack to handle the data packet after being generated by a protocol driver of the stack.

The data structure (into which the tag is placed) may include a data structure defined by a system call interface specification for the stack to facilitate sending of the data packet. The handler may place the tag in a field of the data structure that is observed to be an unused field of the data structure, such as a Status field. In some examples, the tag includes a static value, dynamic value defined at boot-time of the computer system, a random value, or some combination of one or more of the foregoing.

The established protocol for sending data packets from the computer system may include passing the data packet through a send path of the stack, the send path including a protocol layer, a filter layer, and a device-agnostic interface layer of the stack, where the first component (the tagging component) is installed either in the protocol layer of the send path or in the filter layer of the send path, and where the second component (the checking component) is installed in the interface layer of the send path. As examples, the tagging component may be installed in the send path either as a last entity in the protocol layer to handle the data packet or a first entity in the filter layer to handle the data packet, and the checking component may be installed in the send path as a first entity in the interface layer to handle the data packet. The checking component may be a handler that hooks a function to deliver the data packet to the module that interfaces the network hardware, as an example.

Aspects described herein may be used to protect against attempts by malware to exfiltrate data. As a specific example case, the attempt to send the data packet includes a malicious component introducing the data packet into the stack such that the tagging component and placement, by the tagging component, of the tag into the data structure is bypassed. In this situation, the checking would indicate non-presence of the tag, and it will be determined based on that checking indicating non-presence of the tag that the attempt to send the data packet has deviated from the established protocol.

Figure 9:
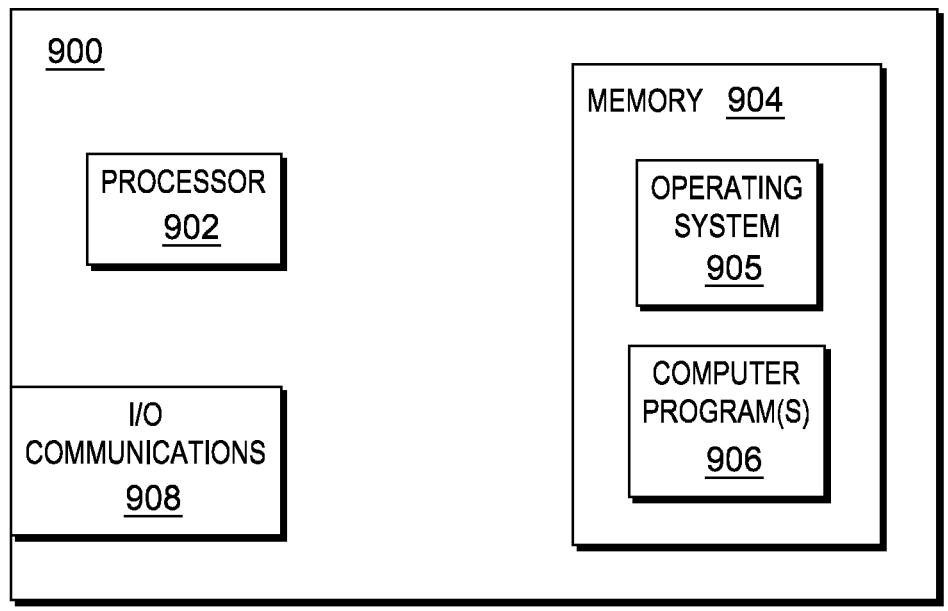
FIG. 9 depicts one example embodiment of a computer system incorporating aspects described herein.

FIG. 9 depicts one example embodiment of a computer system incorporating aspects described herein. Computer system 900 includes a processor 902 and memory 904. Processor 902 includes any appropriate hardware component(s) capable of executing one or more instructions from memory 904. Memory 904 includes one or more operating systems 905 and computer programs 906, such as programs that implement protocols for sending data packets from computer system 900. Computer programs 906 also include facilities to implement aspects of LastDefense as described herein.

Further, computer system 900 includes an input/output (I/O) communications interface component 908 for communicating data between computer system 900 and external devices, such as I/O and peripheral devices (mouse, keyboard, display devices) and network devices.

In some embodiments, aspects described herein may take the form of a computer program product embodied in one or more computer readable medium(s). The one or more computer readable medium(s) may have embodied thereon computer readable program code. Various computer readable medium(s) or combinations thereof may be utilized. For instance, the computer readable medium(s) may comprise a computer readable storage medium, examples of which include (but are not limited to) one or more electronic, magnetic, optical, or semiconductor systems, apparatuses, or devices, or any suitable combination of the foregoing. Example computer readable storage medium(s) include, for instance: an electrical connection having one or more wires, a portable computer diskette, a hard disk or mass-storage device, a random access memory (RAM), read-only memory (ROM), and/or erasable-programmable read-only memory such as EPROM or Flash memory, an optical fiber, a portable compact disc read-only memory (CD-ROM), an optical storage device, a magnetic storage device (including a tape device), or any suitable combination of the above. A computer readable storage medium is defined to comprise a tangible medium that can contain or store program code for use by or in connection with an instruction execution system, apparatus, or device, such as a processor. The program code stored in/on the computer readable medium therefore produces an article of manufacture (such as a "computer program product") including program code.

Figure 10:
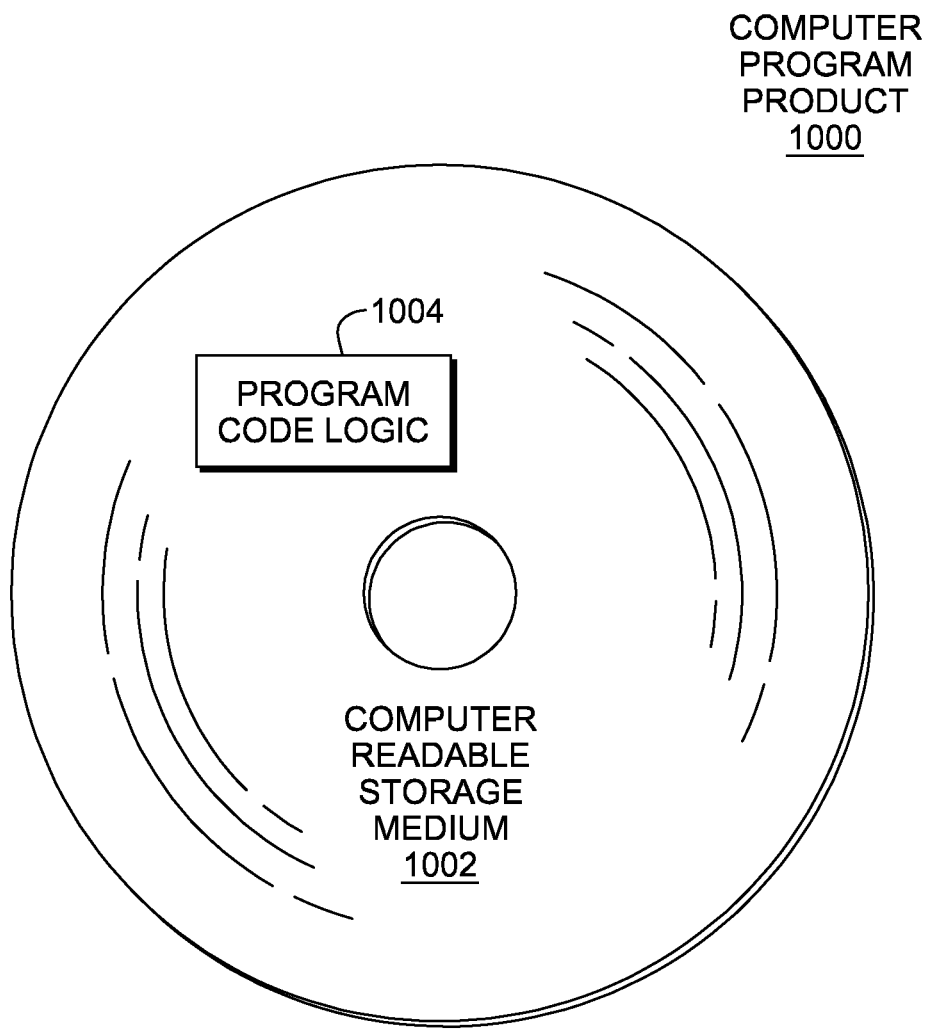
FIG. 10 depicts one embodiment of a computer program product incorporating aspects described herein.

Referring now to FIG. 10, in one example, a computer program product 1000 includes, for instance, one or more computer readable media 1002 to store computer readable program code means or logic 1004 thereon to provide and facilitate one or more aspects of the present invention.

Program code contained or stored in/on a computer readable medium can be obtained and executed by a computer system (computer, computer system, etc. including a component thereof) and/or other devices to cause the computer system, component thereof, and/or other device to behave/function in a particular manner. The program code can be transmitted using any appropriate medium, including (but not limited to) wireless, wireline, optical fiber, and/or radio-frequency. Program code for carrying out operations to perform, achieve, or facilitate aspects of the present invention may be written in one or more programming languages. In some embodiments, the programming language(s) include object-oriented and/or procedural programming languages such as C, C++, C#, Java, etc. Program code may execute entirely on the user's computer, entirely remote from the user's computer, or a combination of partly on the user's computer and partly on a remote computer. In some embodiments, a user's computer and a remote computer are in communication via a network such as a local area network (LAN) or a wide area network (WAN), and/or via an external computer (for example, through the Internet using an Internet Service Provider).

In one example, program code includes one or more program instructions obtained for execution by one or more processors. Computer program instructions may be provided to one or more processors of, e.g., one or more computer system, to produce a machine, such that the program instructions, when executed by the one or more processors, perform, achieve, or facilitate aspects of the present invention, such as actions or functions described in flowcharts and/or block diagrams described herein. Thus, each block, or combinations of blocks, of the flowchart illustrations and/or block diagrams depicted and described herein can be implemented, in some embodiments, by computer program instructions.

The flowcharts and block diagrams depicted and described with reference to the Figures illustrate the architecture, functionality, and operation of possible embodiments of systems, methods and/or computer program products according to aspects of the present invention. These flowchart illustrations and/or block diagrams could, therefore, be of methods, apparatuses (systems), and/or computer program products according to aspects of the present invention.

In some embodiments, as noted above, each block in a flowchart or block diagram may represent a module, segment, or portion of code, which comprises one or more executable instructions for implementing the specified behaviors and/or logical functions of the block. Those having ordinary skill in the art will appreciate that behaviors/functions specified or performed by a block may occur in a different order than depicted and/or described, or may occur simultaneous to, or partially/wholly concurrent with, one or more other blocks. Two blocks shown in succession may, in fact, be executed substantially concurrently, or the blocks may sometimes be executed in the reverse order. Additionally, each block of the block diagrams and/or flowchart illustrations, and combinations of blocks in the block diagrams and/or flowchart illustrations, can be implemented wholly by special-purpose hardware-based systems, or in combination with computer instructions, that perform the behaviors/functions specified by a block or entire block diagram or flowchart.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprise" (and any form of comprise, such as "comprises" and "comprising"), "have" (and any form of have, such as "has" and "having"), "include" (and any form of include, such as "includes" and "including"), and "contain" (and any form contain, such as "contains" and "containing") are open-ended linking verbs. As a result, a method or device that "comprises", "has", "includes" or "contains" one or more steps or elements possesses those one or more steps or elements, but is not limited to possessing only those one or more steps or elements. Likewise, a step of a method or an element of a device that "comprises", "has", "includes" or "contains" one or more features possesses those one or more features, but is not limited to possessing only those one or more features. Furthermore, a device or structure that is configured in a certain way is configured in at least that way, but may also be configured in ways that are not listed.

The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method comprising:
    determining whether an attempt to send a data packet from a computer system has deviated from an established protocol for sending data packets from the computer system, the determining comprising:
        obtaining a data structure describing the data packet; and
        based on invocation of a function to deliver the data packet to a module of a stack of the computer system, the module interfacing network hardware for sending the data packet, checking for presence of a tag placed in the data structure by a component of the stack and indicative of whether the attempt to send the data packet has deviated from the established protocol; and
    performing processing based on the determining, wherein the attempt to send the data packet comprises introduction of the data packet into the stack such that the component and placement, by the component, of the tag into the data structure is bypassed, wherein the checking indicates non-presence of the tag and it is determined based on the checking that the attempt to send the data packet has deviated from the established protocol.

2. The method of claim 1, wherein the stack is a driver stack and the module is a driver of the driver stack.

3. The method of claim 1, further comprising installing the component into the stack, wherein the component is a handler configured to perform, based on the data packet being generated by a protocol driver of the stack, placing the tag in the data structure describing the data packet.

4. The method of claim 3, wherein the component places the tag in a field of the data structure that is observed to be an unused field of the data structure.

5. The method of claim 3, wherein the tag comprises a value defined at boot-time of the computer system or a random value.

6. The method of claim 3, wherein installing the component into the stack comprises replacing a function pointer of a send handler defined by a system call interface specification for the stack with a pointer to the handler to place the tag, wherein the replacing positions the handler to place the tag as a first entity of the stack to handle the data packet after being generated by the protocol driver of the stack.

7. The method of claim 3, wherein the component installed into the stack comprises a first component, and wherein the method further comprises installing a second component into the stack, the second component configured to perform the checking.

8. The method of claim 7, wherein the second component is a second handler that hooks the function to deliver the data packet to the module interfacing the network hardware.

9. The method of claim 7, wherein the established protocol comprises passing the data packet through a send path of the stack, the send path comprising a protocol layer, a filter layer, and an interface layer of the stack, wherein the first component is installed either in the protocol layer of the send path or in the filter layer of the send path, and wherein the second component is installed in the interface layer of the send path.

10. The method of claim 9, wherein the first component is installed in the send path either as a last entity in the protocol layer to handle the data packet or a first entity in the filter layer to handle the data packet, and wherein the second component is installed in the send path as a first entity in the interface layer to handle the data packet.

11. The method of claim 3, wherein the data structure comprises a data structure defined by a system call interface specification for the stack to facilitate sending of the data packet.

12. The method of claim 1, further comprising, based on generation of another data packet;
  placing another tag in a data structure describing the another data packet;
  repeating the determining, wherein the repeating the determining determines whether an attempt to send the another data packet from the computer system has deviated from the established protocol by obtaining another data structure describing the another data packet, and checking for presence of the another tag placed in the another data structure by the component of the stack, the another tag indicative of whether the attempt to send the another data packet has deviated from the established protocol; and
  repeating the performing processing, wherein the performing processing comprises, based on the checking for presence of the another tag indicating that the another tag is present, removing the another tag and permitting the attempt to send the another data packet to proceed.

13. The method of claim 1, wherein the performing processing comprises performing one or more of the following:
  logging contents of the data packet for analysis; and
  blocking the data packet from being sent from the computer system.

14. A computer program product comprising:
  a non-transitory computer-readable storage medium comprising program instructions for execution by a processor to perform a method comprising:
    determining whether an attempt to send a data packet from a computer system has deviated from an established protocol for sending data packets from the computer system, the determining comprising:
      obtaining a data structure describing the data packet; and
      based on invocation of a function to deliver the data packet to a module of a stack of the computer system, the module interfacing network hardware for sending the data packet, checking for presence of a tag placed in the data structure by a component of the stack and indicative of whether the attempt to send the data packet has deviated from the established protocol; and
    performing processing based on the determining, wherein the attempt to send the data packet comprises introduction of the data packet into the stack such that the component and placement, by the component, of the tag into the data structure is bypassed, wherein the checking indicates non-presence of the tag and it is determined based on the checking that the attempt to send the data packet has deviated from the established protocol.

15. The computer program product of claim 14, wherein the method further comprises installing the component into the stack, wherein the component is a handler configured to perform, based on the data packet being generated by a protocol driver of the stack, placing the tag in the data structure describing the data packet.

16. The computer program product of claim 15, wherein the component installed into the stack comprises a first component, and wherein the method further comprises installing a second component into the stack, the second component configured to perform the checking, wherein the second component is a second handler that hooks the function to deliver the data packet to the module interfacing the network hardware.

17. A computer system comprising:
  a memory; and
  a processor in communication with the memory, wherein the computer system is configured to perform a method comprising:
    determining whether an attempt to send a data packet from the computer system has deviated from an established protocol for sending data packets from the computer system, the determining comprising:
      obtaining a data structure describing the data packet; and
      based on invocation of a function to deliver the data packet to a module of a stack of the computer system, the module interfacing network hardware for sending the data packet, checking for presence of a tag placed in the data structure by a component of the stack and indicative of whether the attempt to send the data packet has deviated from the established protocol; and
    performing processing based on the determining, wherein the attempt to send the data packet comprises introduction of the data packet into the stack such that the component and placement, by the component, of the tag into the data structure is bypassed, wherein the checking indicates non-presence of the tag and it is determined based on the checking that the attempt to send the data packet has deviated from the established protocol.

18. The computer system of claim 17, wherein the method further comprises installing the component into the stack, wherein the component is a handler configured to perform, based on the data packet being generated by a protocol driver of the stack, placing the tag in the data structure describing the data packet.

19. The computer system of claim 18, wherein the component installed into the stack comprises a first component, and wherein the method further comprises installing a second component into the stack, the second component configured to perform the checking, wherein the second component is a second handler that hooks the function to deliver the data packet to the module interfacing the network hardware.

* * * * *